(12) United States Patent
Burkhardt et al.

(10) Patent No.: US 7,528,693 B2
(45) Date of Patent: May 5, 2009

(54) TRANSFORMER AND STARTING DEVICE HAVING A TRANSFORMER, AND HIGH PRESSURE DISCHARGE LAMP HAVING A TRANSFORMER

(75) Inventors: Matthias Burkhardt, Hohenbrunn (DE); Conrad Schimke, Berlin (DE)

(73) Assignee: Osram Gesellschaft Mit Beschraenkter Haftung, Munich (DE)

( * ) Notice: Subject to any disclaimer, the term of this patent is extended or adjusted under 35 U.S.C. 154(b) by 463 days.

(21) Appl. No.: 11/210,877

(22) Filed: Aug. 25, 2005

(65) Prior Publication Data

US 2006/0055340 A1 Mar. 16, 2006

(30) Foreign Application Priority Data

Sep. 10, 2004 (DE) ......... 10 2004 044 368

(51) Int. Cl.
*H01F 27/29* (2006.01)
(52) U.S. Cl. .................................... 336/192
(58) Field of Classification Search ............ 336/65, 336/83, 192, 200; 315/57, 219, 276
See application file for complete search history.

(56) References Cited

U.S. PATENT DOCUMENTS 5,959,407 A * 9/1999 Ito et al. ............... 315/82
6,084,354 A * 7/2000 Kohmura et al. ........ 315/57
6,479,948 B2 * 11/2002 Yamamoto et al. ...... 315/289
6,731,076 B1 5/2004 Gerhard et al.

FOREIGN PATENT DOCUMENTS

| EP | 0 484 074 | 5/1992 |
|---|---|---|
| EP | 0 515 958 | 12/1992 |
| EP | 1 096 836 | 5/2001 |
| FR | 2 838 912 | 4/2003 |
| JP | 04303905 A * | 10/1992 |
| WO | WO 00/59269 | 10/2000 |

* cited by examiner

Primary Examiner—Tuyen T. Nguyen

(57) ABSTRACT

The invention relates to a transformer for generating a starting voltage for a high-pressure discharge lamp having a ferrite core and at least one primary winding as well as at least one secondary winding, the at least one secondary winding being formed by a metal strip which is arranged on the ferrite core such that the high-voltage carrying end of the at least one secondary winding is arranged on the inside. In addition, the invention relates to a high-pressure discharge lamp, preferably a mercury-free metal halide high-pressure discharge lamp, having such a transformer which is arranged as a starting transformer in the lamp base of the lamp, and to a high-pressure discharge lamp having a transformer which is arranged in the lamp base and whose secondary winding has a DC resistance of less than or equal to 0.5 ohm.

11 Claims, 5 Drawing Sheets

Figure 1:
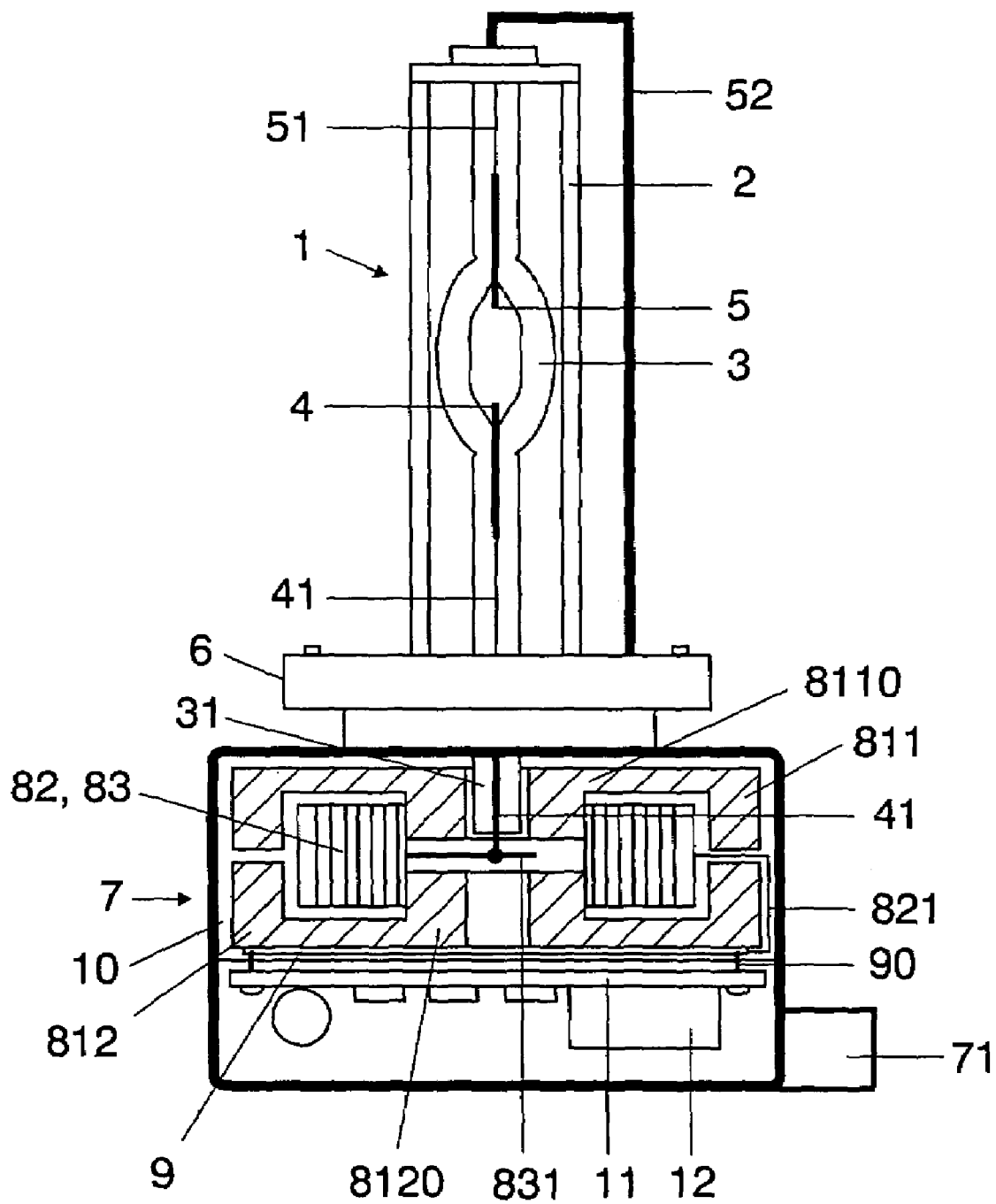

TRANSFORMER AND STARTING DEVICE HAVING A TRANSFORMER, AND HIGH PRESSURE DISCHARGE LAMP HAVING A TRANSFORMER

I. TECHNICAL FIELD

The invention relates to a transformer for generating a starting voltage for a high-pressure discharge lamp having a ferrite core and at least one primary winding as well as at least one secondary winding and to a starting device and a high-pressure discharge lamp having such a transformer.

II. BACKGROUND ART

Such a transformer has been disclosed, for example, in the international patent application with the publication number WO 00/59269. This laid-open specification describes a high-pressure discharge lamp, a ring-core transformer having a primary winding and a secondary winding being arranged in the lamp base of said high-pressure discharge lamp. The ring-core transformer is part of a starting device for starting the gas discharge in the high-pressure discharge lamp.

III. DISCLOSURE OF THE INVENTION

The object of the invention is to provide a transformer which is better suited as a starting transformer for a high-pressure discharge lamp.

This object is achieved according to the invention by a transformer for generating a starting voltage for a high-pressure discharge lamp having a ferrite core and at least one primary winding as well as at least one secondary winding, wherein the at least one secondary winding is formed by a metal strip which is arranged on the ferrite core such that the high-voltage carrying end of the at least one secondary winding is arranged on the inside. Particularly advantageous embodiments of the invention are described in the dependent patent claims.

The transformer according to the invention has a ferrite core having at least one primary winding as well as at least one secondary winding, the at least one secondary winding being formed by a metal strip which is arranged on the ferrite core such that the high-voltage carrying end of the at least one secondary winding is arranged on the inside.

Owing to the design of the at least one secondary winding as a metal strip, a physically compact design of the transformer is made possible, with the result that it can be positioned in the interior of the lamp base of a high-pressure discharge lamp for vehicle headlights. The abovementioned metal strip also makes it possible for a secondary winding to be designed to have a very low DC resistance. Since the high-voltage carrying end of the at least one secondary winding is arranged on the inside, the transformer according to the invention makes possible improved insulation of the high-voltage carrying end and improved isolation of the high-voltage carrying end of the at least one secondary winding from the primary winding. In addition, owing to this inner arrangement of the high-voltage carrying end of the at least one secondary winding, the transformer according to the invention is better prepared for making contact with the power supply line which is passed out of the base-side end of the discharge vessel since the abovementioned power supply line extends approximately on the longitudinal axis of the high-pressure discharge lamp.

In order to ensure a design of the transformer according to the invention which is as compact as possible, in similar fashion to an autotransformer, a first end of the at least one secondary winding is connected to one end of the at least one primary winding, and the second end of the at least one secondary winding is the abovementioned high-voltage carrying end. As a result, the interconnected ends of the primary and secondary winding are at the same electrical potential. The at least one primary winding is preferably arranged on the at least one secondary winding such that the interconnected ends of the two abovementioned transformer windings and also the other end of the at least one primary winding are arranged on the outside. The abovementioned first end of the at least one secondary winding is therefore preferably arranged on its outer turn. As a result, physical isolation of the high-voltage carrying end of the at least one secondary winding from the ends of the at least one primary winding is achieved. This physical arrangement can be achieved in an advantageous manner by the at least one secondary winding being arranged on a cylindrical section of the ferrite core, the winding axis of the at least one secondary winding lying on the cylinder axis of the cylindrical section, and the high-voltage carrying end of the at least one secondary winding being arranged on the inner turn, which lies closest to the cylindrical ferrite core section, of said secondary winding. The turns of the at least one secondary winding are preferably arranged one above the other in several layers, two adjacent layers or turns being isolated by an electrically insulating material. As a results, an electrical short circuit is prevented between the turns, and only a small proportion of the high voltage generated by the transformer during operation is applied between two adjacent turns or layers. The insulating material used is advantageously a plastic strip which can be wound, together with the metal strip of the at least one secondary winding, onto a rod or a coil former of the transformer according to the invention. The width of the plastic strip is preferably greater than the width of the abovementioned metal strip, and the plastic strip protrudes beyond the metal strip at both longitudinal edges in order to prevent an electrical short circuit between the turns or layers of the at least one secondary winding.

Figure 6:
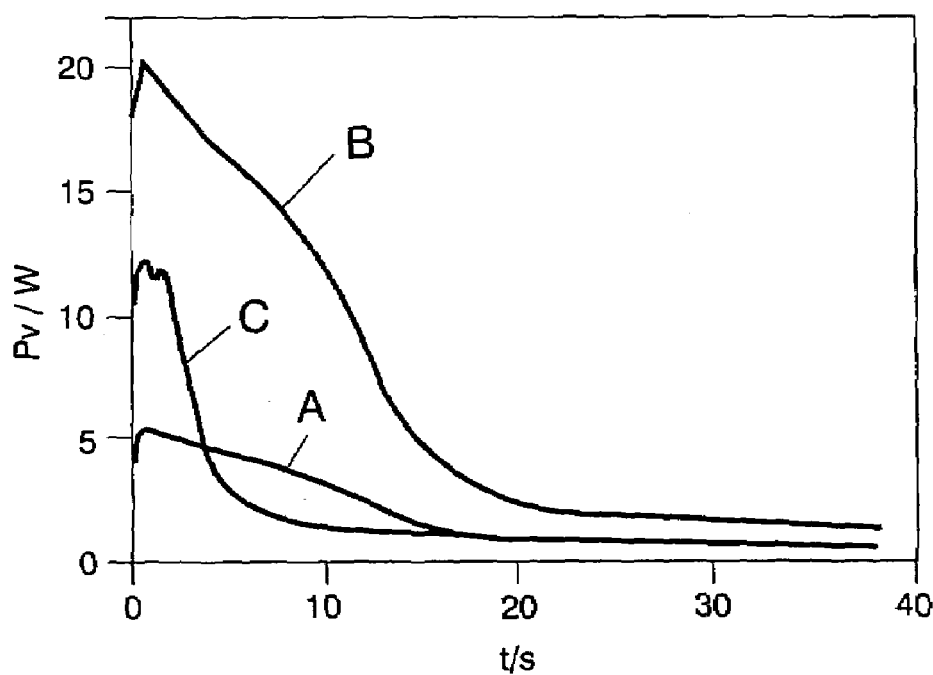
Figure 7:
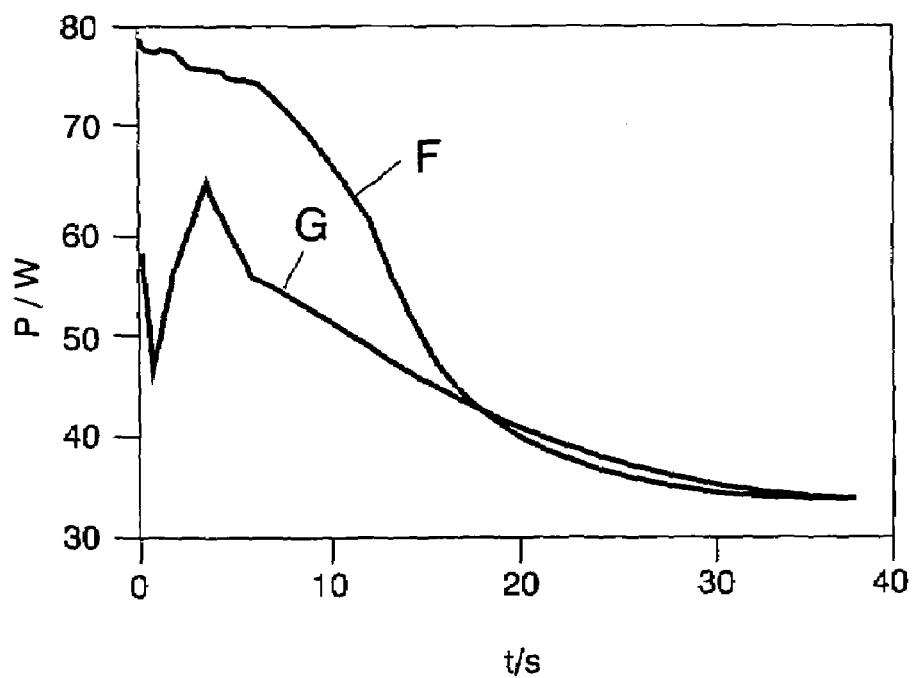
Figure 8:
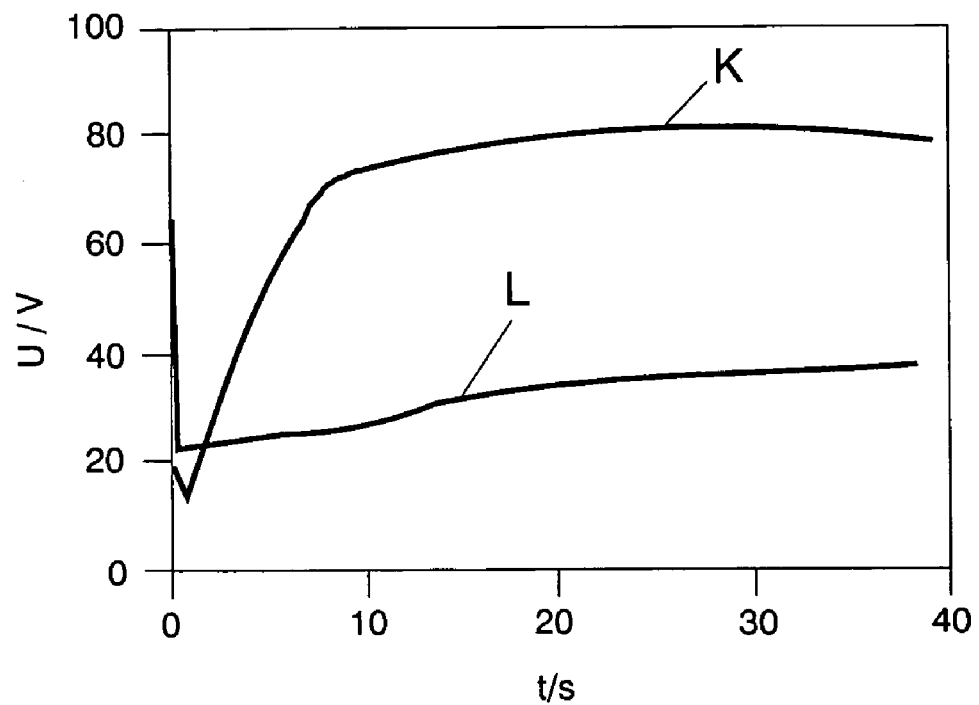

The at least one secondary winding of the transformer according to the invention is preferably designed such that its DC resistance is less than or equal to 0.5 ohm. The transformer according to the invention is therefore also suitable for use as a starting transformer for a mercury-free metal halide high-pressure discharge lamp which is used in vehicle headlights and has a power rating of 35 watts. The measurement curves A and B in FIG. 6 show, for comparison purposes, the waveform of the power loss, which occurs in a starting device with the transformer according to the invention (curve A) and with a conventional transformer (curve B), for a mercury-free metal halide high-pressure discharge lamp when the lamp current is flowing through the secondary windings during lamp operation. The secondary winding of the transformer according to the invention has a DC resistance of only 0.5 ohm, while the DC resistance of the secondary winding of the conventional transformer is 2.0 ohms. The power loss in the case of the starting device with the transformer according to the invention is only a quarter of the power loss of the starting device with the conventional transformer. For comparison purposes, measurement curve C in FIG. 6 also shows the waveform of the power loss, which occurs in a starting device with the abovementioned conventional transformer, for a mercury-containing metal halide high-pressure discharge lamp. It can be seen from the comparison of measurement curves A and C that, during operation of a mercury-free metal halide high-pressure discharge lamp, the DC resistance of the secondary winding, through which the lamp current flows, needs to be reduced to 25 percent of the conventional value in order to reduce the power loss in the starting device to the level of the power loss which occurs during operation of a mercury-containing metal halide high-pressure discharge lamp in the starting device. Given the same power consumption, mercury-free metal halide high-pressure discharge lamps have a markedly higher lamp current than mercury-containing metal halide high-pressure discharge lamps, as can be seen from measurement curves D and E in FIG. 9. The measurement curves D and E show the waveform of the lamp current for a mercury-free and, respective mercury-containing metal halide high-pressure discharge lamp. Owing to the higher lamp current, the losses in the secondary winding of the transformer through which the lamp current flows are correspondingly higher. FIGS. 7 and 8 show a comparison of the power consumption and the operating voltage for these lamps. FIG. 7 shows the waveform of the power consumption for the above mercury-free metal halide high-pressure discharge lamp (measurement curve F) and the mercury-containing metal halide high-pressure discharge lamp (measurement curve G). During the starting phase, the mercury-free metal halide high-pressure discharge lamp has a higher power consumption than the mercury-containing metal halide high-pressure discharge lamp. Once the starting phase has ended, the power consumption of the two abovementioned lamps corresponds approximately to their power rating of 35 watts. FIG. 8 shows the waveform of the operating voltage for these lamps. The mercury-containing metal halide high-pressure discharge lamp (measurement curve K) has a higher operating voltage than the mercury-free metal halide high-pressure discharge lamp (measurement curve L).

The transformer according to the invention is advantageously designed such that it has a magnetic return path in order to reduce any interaction of its magnetic field with metallic parts of the high-pressure discharge lamp, for example with a metal housing surrounding the lamp base and acting as an electromagnetic shield, or of the vehicle headlight. The ferrite core of the transformer according to the invention is therefore preferably in the form of a pot-shaped core. As a result, the windings of the transformer are largely surrounded by the ferrite material, and the stray field of the transformer which is effective towards the outside is low.

The transformer according to the invention is suitable, owing to its advantages explained above, as a starting transformer in a starting device for high-pressure discharge lamps, in particular for metal halide high-pressure discharge lamps used in vehicle headlights and having a power rating of 35 watts.

The transformer according to the invention is preferably arranged in the interior of the lamp base of a high-pressure discharge lamp, in particular of a metal halide high-pressure discharge lamp for vehicle headlights. The transformer is part of a starting device, for example of a pulse starting device, for the high-pressure discharge lamp. In addition, the other electrical components of the starting device are preferably also accommodated in the interior of the lamp base.

The high-pressure discharge lamp according to the invention, preferably a metal halide high-pressure discharge lamp for vehicle headlights, has a transformer arranged in the interior of its lamp base for generating its starting voltage, the transformer having at least one secondary winding, whose DC resistance is less than or equal to 0.5 ohm in order to reduce the above-described power losses in the starting device.

In accordance with the particularly preferred exemplary embodiment of the high-pressure discharge lamp according to the invention, a transformer according to the invention is accommodated in the lamp base of said high-pressure discharge lamp, and the ferrite core of said transformer is in the form of a pot-shaped core, the pot-shaped core having a hollow-cylindrical section which is arranged in the interior of the pot-shaped core, and whose inner diameter is greater than the outer diameter of that base-side end of the discharge vessel of the high-pressure discharge lamp which protrudes into the hollow-cylindrical section. As a result, a space-saving arrangement of the lamp vessel and the transformer is achieved. In addition, the base-side end of the discharge vessel acts as insulation for the base-side power supply line of the lamp which extends therein. The at least one secondary winding of the transformer is, for the same reason, preferably arranged directly on the hollow-cylindrical section of the pot-shaped core or on a coil former surrounding this section. The high-voltage carrying end of the at least one secondary winding of the transformer is preferably connected to the abovementioned base-side power supply line of the high-pressure discharge lamp. As a result, effective high-voltage insulation of the lamp is ensured. In particular, only the base-side power supply line, which is almost completely surrounded by the lamp vessel, has the starting voltage applied to it, and the high-voltage carrying parts are arranged within the pot-shaped core. The transformer arranged in the lamp base is advantageously embedded in an electrically insulating casting compound. As a result, on the one hand electrical insulation between the windings or the turns of the windings is improved and, on the other hand, even the two halves of the pot-shaped core are fixed at a set distance from one another.

In order to make it easier for contact to be made between the transformer and the other electrical components of the starting device, a carrier plate provided with metallic contact pins is provided, the contact pins each being connected to one end of the at least one primary winding. The carrier plate is made from an electrically insulating material and is fixed on the outside of the transformer. It may likewise be embedded in the abovementioned casting compound. The contact pins make possible a plug connection with the electrical connections of a mounting circuit board on which the other components of the starting device are advantageously mounted and on which contact is made with said components. The mounting circuit board with the other components of the starting device fixed thereon can therefore be inserted as a prefabricated module into the lamp base, and contact can be made between it and the transformer by the abovementioned plug connection.

IV. BRIEF DESCRIPTION OF THE DRAWINGS

Figure 2:
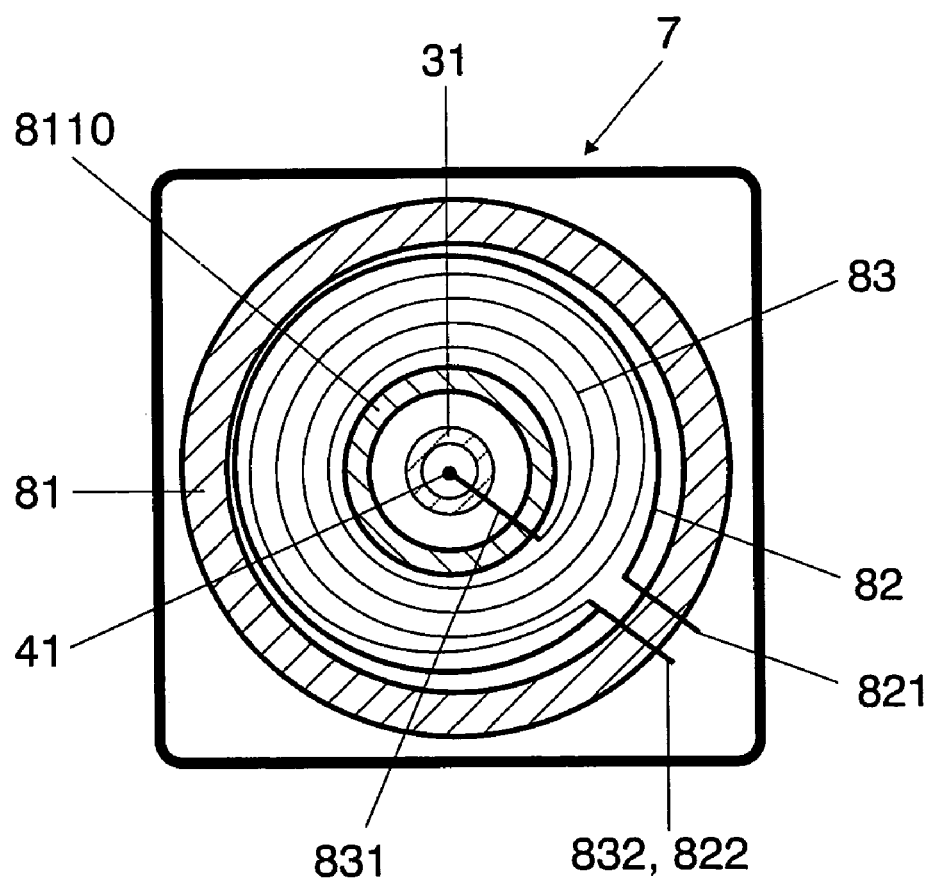
Figure 3:
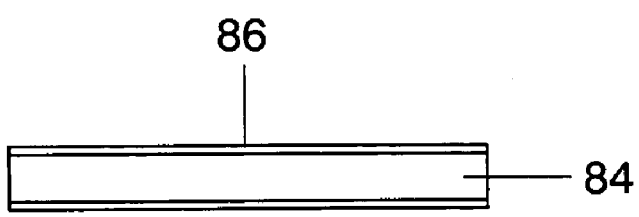
Figure 4:
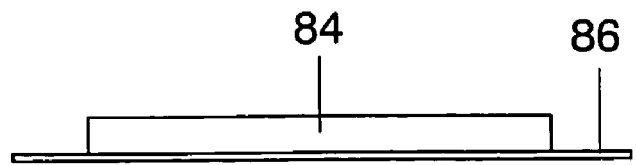
Figure 5:
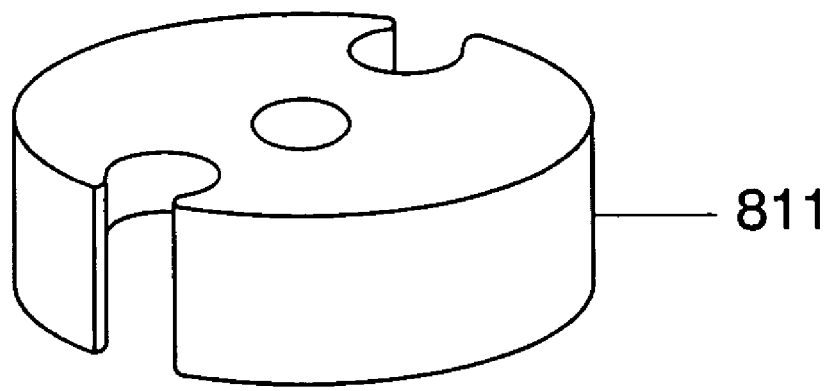
Figure 5:
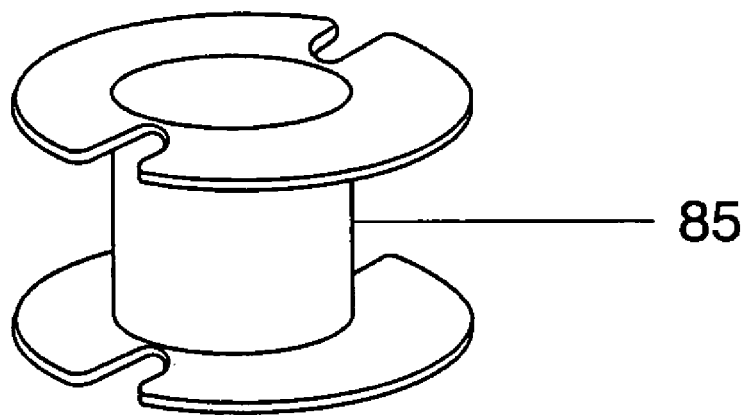
Figure 5:
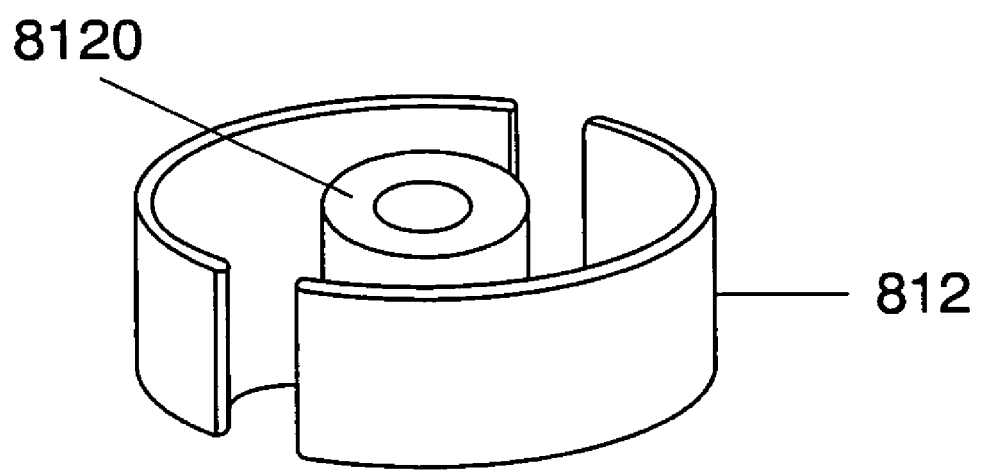
Figure 9:
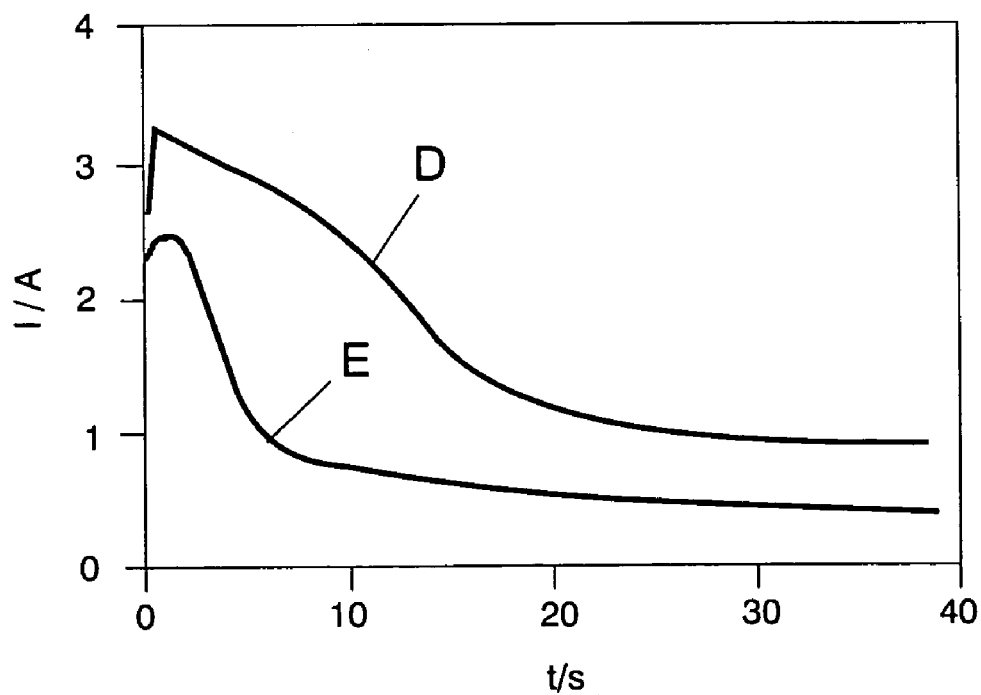

The invention will be explained in more detail below with reference to a preferred exemplary embodiment. In the drawings:

FIG. 1 shows a partially sectioned, schematic illustration of a side view of a high-pressure discharge lamp having a transformer arranged in the lamp base in accordance with the preferred exemplary embodiment of the invention, FIG. 2 shows a cross section through the lamp base depicted in FIG. 1 and the transformer on a plane perpendicular to the longitudinal axis of the lamp, FIG. 3 shows a schematic plan view of the copper strip and the plastic strip, from which the secondary winding of the transformer depicted in FIG. 1 is made, FIG. 4 shows a schematic side view of the copper strip shown in FIG. 3 and of the plastic strip, FIG. 5 shows a schematic illustration of the two halves of the ferrite core of the transformer depicted in FIG. 1 and of the coil former, FIG. 6 shows the waveform of the power loss, occurring in the starting device, for a mercury-free metal halide high-pressure discharge lamp having the transformer according to the invention (curve A) and a conventional transformer (curve B) as well as for a mercury-containing metal halide high-pressure discharge lamp having a conventional transformer (curve C), FIG. 7 shows the waveform of the power consumption for a mercury-free metal halide high-pressure discharge lamp (curve D) and for a mercury-containing metal halide high-pressure discharge lamp (curve E), FIG. 8 shows the waveform of the operating voltage for the mercury-free metal halide high-pressure discharge lamp (curve F) and the mercury-containing metal halide high-pressure discharge lamp (curve G), and FIG. 9 shows the waveform of the lamp current for the mercury-free metal halide high-pressure discharge lamp (curve D) and the mercury-containing metal halide high-pressure discharge lamp (curve E).

V. BEST MODE FOR CARRYING OUT THE INVENTION

The exemplary embodiment of the invention depicted in FIG. 1 is a mercury-free metal halide high-pressure discharge lamp having a power rating of 35 watts which is envisaged for use in a vehicle headlight.

This lamp 1 has a discharge vessel 3, which is surrounded by an outer bulb 2, is sealed at two ends, and in which an ionizable filling and two electrodes 4, 5 for generating a gas discharge are arranged. The lamp vessels 2, 3 are made from silica glass and are fixed in an annular flange 6 of the plastic lamp base 7. The electrodes 4, 5 are each connected to a power supply line 41, 51 which is passed out of the discharge vessel 3. The power supply line 51, which is passed out of that end of the discharge vessel 3 which is remote from the base, makes contact with the electrical connection 71 of the lamp base 7 via a power return line 52 which is passed back to the lamp base 7. A transformer 8 having a ferrite core 81 in the form of a pot-shaped core and a primary winding 82 and a secondary winding 83 is arranged in the interior of the lamp base 7. The transformer 8 is designed to be similar to an autotransformer, i.e. one end 832 of the secondary winding 83 is connected to one end 822 of the primary winding 82. The pot-shaped core 81 has two identical halves 811, 812 which are arranged one above the other in the lamp base 7 and are separated by a gap. The two halves 811, 812 each have a cylindrical section 8110 and 8120, respectively, protruding into the interior of the pot-shaped core. The cylindrical section 8110 of the upper half 811 is in the form of a hollow cylinder, whose inner diameter is greater than the outer diameter of the base-side end 31 of the discharge vessel 3. The base-side end 31 of the discharge vessel 3 protrudes into the hollow-cylindrical section 8110 of the pot-shaped core 81. The power supply line 41, which protrudes from the base-side end 31 of the discharge vessel 3, is welded to the high-voltage carrying end 831 of the secondary winding 83. The above-mentioned welded connection between the end 831 and the power supply line 41 is arranged in a gap between the cylindrical sections 8110, 8120. The two ends 821, 822 of the primary winding 82 are each connected to a metallic contact pin 90 arranged on a carrier plate 9. The carrier plate 9 is made from plastic and is arranged on the underside of the lower half 812 of the pot-shaped core 81. It is embedded, together with the transformer 8, in a casting compound 10. The casting compound 10 also extends into the interior of the pot-shaped core 81 and fills the gap between the two halves 811, 812 of the pot-shaped core 81. The pot-shaped core 81 is made from an electrically highly insulating nickel/zinc ferrite.

A mounting circuit board 11 is plugged onto the carrier plate 9. The two metallic contact pins 90 protruding from the casting compound 10 are each connected to an electrical contact on the mounting circuit board 11. The mounting circuit board 11 is fitted with the other electrical components 12 of the starting device of the high-pressure discharge lamp 1, which is in the form of a pulse starting device. The voltage supply to these components or to the transformer 8 and to the lamp 1 takes place via the electrical connection 71, which is in the form of a socket. The electrical components 12 are essentially a spark gap and a starting capacitor for building up the flashover voltage over the spark gap and possibly also other components. The design of such a pulse starting device has been disclosed, for example, in the above-cited prior art.

The secondary winding 83 of the transformer 8 is made from a copper strip 84 which is wound in many layers onto the coil former 85 of the transformer 8. Each of the layers forms one turn of the secondary winding 83. A plastic strip 86 made from PEN (polyethylene naphthalate) which is arranged between the individual layers or turns of the secondary winding 83 is used for the purpose of electrically insulating adjacent layers or turns of the secondary winding 83. The plastic strip 86 and the copper strip 84 are laid one on top of the other for the purpose of producing the transformer 8 such that the wider plastic strip 86 protrudes beyond the copper strip at the two longitudinal edges. Then, the two strips 84, 86 are wound together onto the coil former 85. The high-voltage carrying end 831 of the secondary winding 83 is connected to the inner turn or the first inner layer on the coil former 85. The copper strip 84 has a width of 6 millimeters and a thickness of 50 micrometers. The plastic strip 86 has a width of 8 millimeters and a thickness of 8 micrometers. The secondary winding 83 has 170 turns which are arranged in 170 layers around the coil former 85. The primary winding 82, which comprises 2.5 turns of a further copper strip having a thickness of 0.2 millimeter and a width of 1.6 millimeters, is wound onto the secondary winding 83. The 2.5 turns of the primary winding 82 are arranged next to one another in one layer over the secondary winding 83 on the coil former 85. The pot-shaped core 81 has a gap which is preferably arranged between the two hollow-cylindrical sections 8110 and 8120. The two halves 811, 812 of the pot-shaped core 81 preferably lie directly one on top of the other, without a gap, such that their outer walls are in contact with one another. The end 821 of the primary winding 82 is preferably passed to the outside through an aperture in the outer wall of the pot-shaped core 81.

The lower part of the housing of the lamp base 7, which lower part faces away from the lamp vessels 2, 3, is in the form of a cover in order to be able to insert the transformer 8 and the mounting circuit board 11, with the components 11 with which contact has been made thereon, into the lamp base 7. The lamp base 7 can be surrounded by a metallic housing (not depicted) at the ground reference potential, as has been disclosed in the above-cited prior art, in order to improve the electromagnetic compatability of the lamp.

The invention is not restricted to the exemplary embodiment explained in more detail above. For example, the ferrite core of the transformer according to the invention may have any desired geometry and need not be in the form of a pot-shaped core. The coil former 85 can be dispensed with if the ferrite core is made from a highly insulating material, such as a nickel/zinc ferrite. In this case, the secondary winding 83 can be wound directly onto a rod. After the winding process, the secondary winding 83 can be removed from the rod and placed onto the hollow-cylindrical section 8110.

The high-pressure discharge lamp according to the invention need not necessarily be equipped with the transformer according to the preferred exemplary embodiment, but may contain any desired transformer in its lamp base, said transformer having a sufficient transformation ratio in order to generate the required starting voltage, and its secondary winding or secondary windings having a DC resistance of preferably less than or equal to 0.5 ohm.

What is claimed is:

1. A high-pressure discharge lamp comprising: a transformer for generating a starting voltage for a high-pressure discharge lamp, the transformer having a ferrite core and at least one primary winding as well as at least one secondary winding, wherein the at least one secondary winding is formed by a metal strip which is arranged on the ferrite core such that the high-voltage carrying end of the at least one secondary winding is arranged on the inside, wherein the ferrite core is in the form of a pot-shaped core, wherein the transformer is arranged within a lamp base, wherein the pot-shaped core of the transformer has a section, which is in the form of a hollow cylinder, is arranged in the interior of the pot-shaped core, and whose inner diameter is greater than the outer diameter of that base-side end of the discharge vessel which protrudes into the hollow cylinder.

2. The high-pressure discharge lamp as claimed in claim 1, wherein the at least one secondary winding is arranged on the hollow-cylindrical section.

3. The high-pressure discharge lamp as claimed in claim 1, wherein the high-voltage carrying end of the at least one secondary winding is connected to a power supply line which protrudes from the base-side end of the discharge vessel.

4. The high-pressure discharge lamp as claimed in claim 1, wherein the transformer is embedded in an electrically insulating casting compound.

5. The high-pressure discharge lamp as claimed in claim 1, wherein a mounting circuit board having electrical components of a starting device for the high-pressure discharge lamp which are mounted thereon and with which contact is made is arranged within the lamp base.

6. The high-pressure discharge lamp as claimed in claim 5, wherein a carrier plate provided with contact pins is arranged between the transformer and the mounting circuit board, the contact pins each being connected to one end of the at least one primary winding and being connected to electrical contacts on the mounting circuit board.

7. The high-pressure discharge lamp as claimed in claim 1, which is in the form of a metal halide high-pressure discharge lamp for vehicle headlights.

8. A high-pressure discharge lamp for vehicle headlights, in particular a metal halide high-pressure discharge lamp, having a lamp base and a transformer arranged in the interior of the lamp base for generating the starting voltage for the high-pressure discharge lamp, wherein the transformer for generating a starting voltage for the high-pressure discharge lamp, the transformer having a ferrite core and at least one primary winding as well as at least one secondary winding, wherein the at least one secondary winding is formed by a metal strip which is arranged on the ferrite core such that the high-voltage carrying end of the at least one secondary winding is arranged on the inside, wherein the ferrite core is in the form of a pot-shaped core, wherein the transformer is arranged within a lamp base, wherein the pot-shaped core of the transformer has a section, which is in the form of a hollow cylinder, is arranged in the interior of the pot-shaped core, and whose inner diameter is greater than the outer diameter of that base-side end of the discharge vessel which protrudes into the hollow cylinder, the transformer having at least one secondary winding, wherein the DC resistance of the at least one secondary winding is less than or equal to 0.5 ohm.

9. The high-pressure discharge lamp as claimed in claim 8, wherein the at least one secondary winding of the transformer is formed by a metal strip.

10. The high-pressure discharge lamp as claimed in claim 8, wherein a first end of the at least one secondary winding is connected to one end of a primary winding of the transformer, and the second end of the at least one secondary winding is in the form of a high-voltage carrying end.

11. The high-pressure discharge lamp as claimed in one or more of claims 8, wherein the at least one secondary winding is arranged on a cylindrical section of a ferrite core of the transformer.

* * * * *